(12) United States Patent  (10) Patent No.: US 8,837,814 B2
Arafune  (45) Date of Patent: Sep. 16, 2014

(54) CORRECTION OF GEOMETRIC MISMATCH IN STEREOSCOPIC IMAGES

(75) Inventor: Akira Arafune, Tokyo (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 13/425,936

(22) Filed: Mar. 21, 2012

(65) Prior Publication Data

US 2012/0243776 A1  Sep. 27, 2012

(30) Foreign Application Priority Data

Mar. 22, 2011 (JP) ................. 2011-062020

(51) Int. Cl.
  G06K 9/00  (2006.01)
  G06T 5/00  (2006.01)
  H04N 5/21  (2006.01)
  H04N 13/02  (2006.01)
  H04N 13/00  (2006.01)
  H04N 5/357  (2011.01)

(52) U.S. Cl.
  CPC ............ *H04N 13/0018* (2013.01); *G06T 5/002* (2013.01); *G06T 2207/10016* (2013.01); *H04N 5/21* (2013.01); *H04N 5/3572* (2013.01); *H04N 13/0239* (2013.01); *H04N 13/0025* (2013.01)
  USPC ......................................... 382/154

(58) Field of Classification Search
  CPC ...... G06K 9/40; G06K 2209/40; G06T 5/006; H04N 13/00
  USPC .............................................. 382/154; 348/43
  See application file for complete search history.

(56) References Cited

U.S. PATENT DOCUMENTS

| 7,027,664 | B2* | 4/2006 | Lee et al. ...................... 382/283 |
| 7,508,982 | B2* | 3/2009 | Tsuyuki et al. ................ 382/167 |
| 7,738,042 | B2* | 6/2010 | Kamimura ..................... 348/607 |
| 8,558,875 | B2* | 10/2013 | Morino et al. .................. 348/51 |
| 2012/0155748 | A1* | 6/2012 | Shin .............................. 382/154 |

FOREIGN PATENT DOCUMENTS

JP  2003-69896  3/2003

* cited by examiner

*Primary Examiner* — Stephen R Koziol
*Assistant Examiner* — Totam Le
(74) *Attorney, Agent, or Firm* — Sony Corporation (57) ABSTRACT

An image processing apparatus includes a noise removal unit that corrects a geometric mismatch of optical noise of a left eye image and a right eye image by performing a noise removal process for removing the separately generated optical noise on the left eye image and the right eye image which are captured and obtained by a two-lens type stereoscopic image capturing camera.

13 Claims, 9 Drawing Sheets

|  | LEFT IMAGE | RIGHT IMAGE |
|---|---|---|
| REGION 1 | AL | AR |
| REGION 2 | BL | BR |
| REGION 3 | CL | CR |
| REGION 4 | DL | DR |

CORRECTION OF GEOMETRIC MISMATCH IN STEREOSCOPIC IMAGES

BACKGROUND

The present disclosure relates to an image processing apparatus, an image processing method, and a program. Specifically, the present disclosure relates to an image processing apparatus and the like which process a left eye image and a right, eye image captured by a two-Lens type stereoscopic-image capturing camera.

As methods of acquiring a left eye image and a right eye image forming a stereoscopic (3D) image through photographing, there are a single lens type acquisition method where light sensed by a single lens is optically divided into left and right images inside an optical system, and a two-lens type acquisition method where images at the same time point are acquired through synchronization of different left and right camera systems.

In the camera system, a striation is seen as occurring in a scene where the sun shines in the sky on the upper side of the composition and the landscape is spread on the lower side, a scene where a sport field is illuminated with strong light under the night sky photographed in the nighttime, or the like. In the two-lens type image acquisition method, striation shapes occurring in the left eye image and the right eye image have nothing to do with the geometric correlation which causes stereoscopic (3D) perception, and are a factor which gives discomfort to a viewer of image content because of being emphasized by a light source or a striation and contrast of the background.

For example, Japanese Unexamined Patent Application Publication No. 2003-69896 discloses an embodiment where flare included in an image captured by the camera is corrected. In this embodiment, flare characteristics of the camera are measured in advance, and flare in the captured image is corrected using the flare characteristics. In addition, the flare is a concept including striations and light rays.

SUMMARY

It is desirable to prevent a viewer perceiving stereoscopic images from feeling discomfort due to optical noise, present in a left eye image and a right eye image.

According to an embodiment of the present disclosure, there is provided an image processing apparatus including a noise removal unit that corrects a geometric mismatch of left eye image and a right eye image by performing a noise removal process for removing the separately generated optical noise on the left eye image and the right eye image which are captured and obtained by a two-lens type stereoscopic image capturing camera.

The geometric mismatch of a left eye image and a right eye image is corrected by the noise removal unit, by performing the noise removal process for removing the separately generated optical noise on the left eye image and the right eye image which are captured and obtained by the two-lens type stereoscopic image capturing camera. Here, the optical noise includes flare which occurs due to reflection of light generated from the imaging lens to the imaging device via the lens barrel, and the flare includes striations or light rays.

As such, according to the embodiment of the present disclosure, the geometric mismatch of the left eye image and the right eye image is corrected. For this reason, it is possible to prevent a viewer perceiving stereoscopic images from feeling discomfort due to optical noise present in the left eye image and the right eye image.

For example, the noise removal unit may detect a striation region including a light source, a striation, and a light ray and a striation background region adjacent to the striation regions from each of the left eye image, and the right eye image, and replace the striation region and the striation background region of one image with the striation region and the striation background region of the other image. Thereby, the geometric mismatch of the left eye image and the right eye image is corrected.

In this case, for example, the noise removal unit may include a region division section that divides each of the left eye image and the right eye image into a plurality of regions; a divided region correlation section that correlates regions including the same subject with each other, or regions of images which are generated by an optically identical cause with each other, of the divided regions of the left eye image and the right eye image divided by the region division section; a striation search section that detects a striation region including a light source, a striation, and a light ray and a striation background region adjacent to the striation region from the divided regions of the left eye image and the right eye image divided by the region division section; and an image replacement section that replaces the striation region and the striation background region of one of the left eye image and the right eye image with the striation region and the striation background region of the other image based on the correlation result from the divided region correlation section.

In addition, for example, the noise removal unit may detect a striation region including a light, source, striation, and a light ray and a striation background region adjacent to the striation regions from each of the left eye image and the right eye image, removes the light source, the striation, and the light ray included in the striation region from the left eye image and the right eye image, and give light source, striation and light ray effects having geometric correlation appropriate to view stereoscopic images to the left eye image and the right eye image. Thereby, the geometric mismatch of the left eye image and the right eye image is corrected.

In this case, for example, the noise removal unit may include a region division section that divides each of the left eye image and the right eye image into a plurality of regions; a striation search section that detects a striation region including a light source, a striation, and a light ray from the divided regions of the left eye image and the right eye image divided by the region division section; and an image replacement section that removes the light source, the striation, and the light ray included in the striation region from the left eye image and the right eye image, and gives light source, striation and light ray effects having geometric correlation appropriate to view stereoscopic images to the left eye image and the right eye image.

Moreover, for example, the image processing apparatus May further include a noise removal process determination unit that determines whether or not the noise removal unit performs the noise removal process. Thereby, it is possible to prevent the noise removal process from being performed on the left eye image and the right eye image unnecessarily. In this case, for example, it is possible to reduce a calculation amount of a CPU (Central Processing Unit) and to thereby reduce a load thereof.

In this case, for example, the image processing apparatus may further include an input terminal unit to which the left eye image and the right eye image transmitted from a camera system are input, and photographing setting information transmitted from the camera system is input, and, the noise removal process determination unit may determine whether or not the noise removal process is performed based on a diaphragm value included in the photographing setting information transmitted from the camera system.

In addition, for example, the optical noise may be a striation or a light ray, and the noise removal process determination unit may determine whether or not the noise removal process is performed based on the radius of the striation or the light ray occurring in the left eye image and the right eye image. Moreover, in this case, the optical noise may be a striation, and the noise removal process determination unit may determine whether or not the noise removal process is performed based on the number of the striations occurring in the left eye image and the right eye image.

In addition, in this case, the optical noise may be a striation, and the noise removal process determination unit may determine whether or not the noise removal process is performed based on information for the number of diaphragm blades of a camera lens of a camera used to obtain the left eye image and the right eye image. Further, in this case, the optical noise may be a striation, and the noise removal process determination unit may determine whether or not the noise removal process is performed based on a lasting period of the striation or the light ray occurring in the left eye image and the right eye image.

According to the embodiment of the present disclosure, it is possible to correct a geometric mismatch of a left eye image and a right eye image and to thereby prevent a viewer perceiving stereoscopic images from feeling discomfort.

DETAILED DESCRIPTION OF EMBODIMENTS

Figure 1:
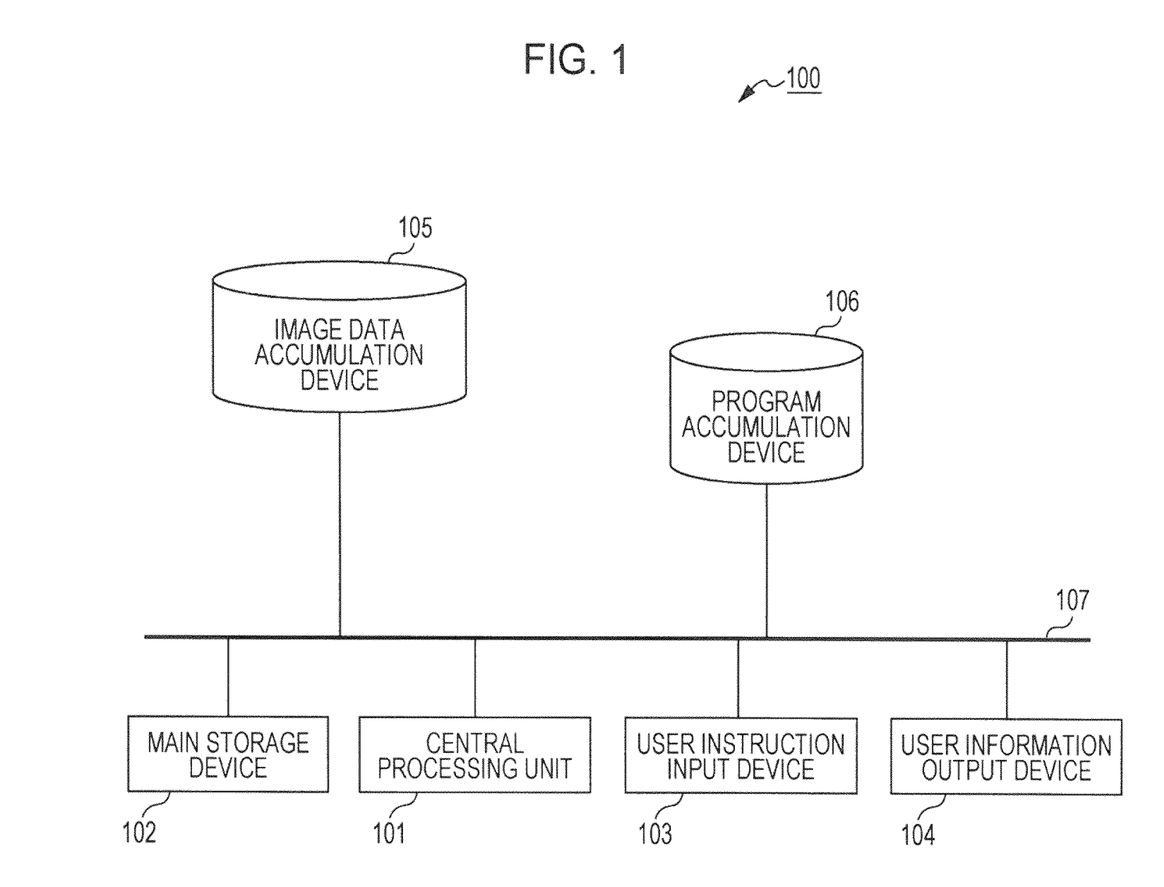
FIG. 1 is a block diagram illustrating a configuration example of the image processing apparatus according to the first embodiment of the present disclosure.

Hereinafter, embodiments of the present disclosure will be described. The description will be made in the following order.
1. FIRST EMBODIMENT
2. SECOND EMBODIMENT
3. MODIFIED EXAMPLE 1. First Embodiment Configuration Example of Image Processing Apparatus FIG. 1 shows a configuration example of an image processing apparatus 100 according to the first embodiment. The image processing apparatus 100 processes a left eye image and a right eye image which are captured and obtained by a two-lens type stereoscopic-image capturing camera.

That is to say, the image processing apparatus 100 performs a noise removal process for removing optical noise which is independently generated, on the left eye image and the right eye image, thereby corrects a geometric mismatch of the optical noise. Here, the optical noise includes flare which occurs due to reflection of light generated from the imaging lens to the imaging device via the lens barrel, and the flare includes striations or light rays. The striation is the same as the light ray, but, generally, the striation indicates a state where an outline is clear, whereas the light ray indicates a state where an outline is obscure. In the following description, for simplicity of the description, the optical noise is assumed as the striation.

The image processing apparatus 100 includes a central processing unit (CPU) 101, a main storage device 102, a user instruction input device 103, a user information output device 104, an image data accumulation device 105, and a program accumulation device 106. The respective devices are connected to an internal bus 107.

The image data accumulation device 105 accumulates data for left eye images and right eye images which are captured and obtained by the two-lens type stereoscopic image capturing camera. In addition, the image data accumulation device 105 also accumulates data for left eye images and right eye images after a noise removal process, is performed. The program accumulation device 106 accumulates process programs of the central processing unit 101. The central processing unit 101 controls the respective devices of the image processing apparatus 100, and performs the noise removal process for removing the above-described optical noise on the left eye images and the right eye images accumulated in the image data accumulation device 105.

The main storage device 102 includes, for example, a ROM (Read Only Memory), a RAM (Random. Access Memory), and the like. For example, the central processing unit 101 reads the process programs from the program accumulation device 106 and develops the read programs on, for example, the RAM of the main storage device 102, thereby performing the above-described control process and noise removal process. The user instruction input device 103 is a keyboard, a mouse, or the like, for inputting a user instruction. The user information output device 104 is a display or the like which presents user operation information, process progress information, and the like, and is provided for convenience of users.

Details of Noise Removal Process

The noise removal process performed by the central processing unit 101 will be described. A program including (1) a region division algorithm, (2) a divided region correlation algorithm, (3) a striation search algorithm, and (4) an image replacement algorithm is preserved in the program accumulation device 106 in an executable format. The program is read to the main storage device 102, and the central processing unit 101 applies each of the algorithms to image data read from the image data accumulation device 105.

The region division algorithm divides image data into a plurality of regions through categorization using a color, luminance, and position coordinates of each pixel. The divided region correlation algorithm correlates regions including the same subject with each other or regions of images which are generated by an optically identical cause with each other, of the divided regions of the left eye image and the right eye image.

The striation search algorithm detects a striation region. In other words, the striation search algorithm specifies, for example, a central position of a light source from a luminance histogram in the X axis direction and the Y axis direction of the image, samples a plurality of points on a circle radius which is located at the same interval from the center, and determines the striation region by comparing sampled luminance distribution and a previous region division result.

In addition, the striation search algorithm detects a striation background region. In other words, the striation search algorithm detects a region which is formed by such uniform color points where chromaticity information or luminance information of constituent pixels is included in a desired variance as the striation background region. For example, of the divided regions, parts where luminance of all the points is close to 0 are designated as the striation background regions, which are denoted by "LBACK" and "RBACK".

Parts formed by points where luminance is close to a saturation value of the recording bit width are designated as striation regions, which are denoted by "Lray" and "RraY".

The image replacement algorithm replaces a Striation region and a striation background region of one image with a striation region and a striation background region of the other image using the region division result. Alternatively, the image replacement algorithm removes a light source and a striation included in the striation region from the left eye image and the right eye image, and gives light source and striation effects having geometric correlation appropriate to view stereoscopic images to both the images.

Figure 2:
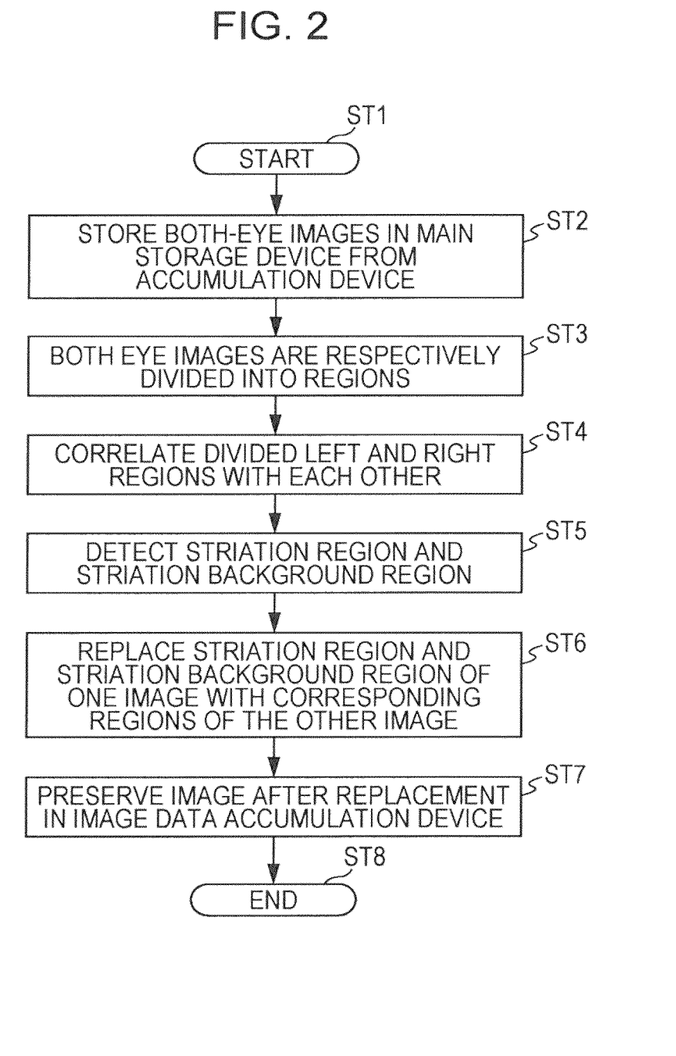
FIG. 2 is a flowchart illustrating an example of the process procedures of the noise removal process in the central processing unit.

The flowchart in FIG. 2 shows an example of process procedures of the noise removal process performed by the central processing unit 101. This example corresponds to process procedures in a case where the image replacement algorithm replaces a striation region and a striation background region of one image with a striation region and a striation background region of the other image using the region division result.

The central processing unit 101 starts processes in step ST1, and then the flow proceeds to a process in step ST2. In step ST2, the central processing unit 101 stores left eye image data and right eye image data to be processed in the main storage device 102 from the image data accumulation device 105.

Next, the central processing unit 101 divides each of the left eye image and the right eye image into a plurality of regions in step ST3. In addition, in step ST4, the central processing unit 101 correlates regions including the same subject with each other or correlates images generated by an optically identical cause with each other, of the divided regions of the left eye image and the right eye image.

Next, the central processing unit 101 detects striation, regions including a light source and a striation and a striation background region adjacent to the striation regions from the respective divided regions of the left eye image and the right eye image in step ST5. In addition, in step ST6, the central processing unit 101 replaces the striation regions and the striation background regions of one of the left eye image and the right eye image with corresponding regions (striation regions and striation background regions) of the other image based on the divided region correlation result. In this case, the central processing unit 101 does not simply perform the replacement but may perform the replacement after performing modification for giving parallax to the striation regions and the striation background regions of one image-Next, in step ST7, the central processing unit 101 preserves image data after the replacement, that is, image data for the other image in the image data accumulation device 105. Thereafter, the central processing unit 101 finishes the processes in step ST8.

The process in each step of the flowchart in FIG. 2 will be described in more detail. In step ST2, the central processing unit 101 reads a left eye image L and a right eye image R which have the same time point information from the image data accumulation device 105 to the main storage device 102. In addition, in step ST3, the central processing unit 101 applies the region division algorithm to each image and performs a region division process. In this case, the central processing unit 101 performs the region division process by applying an existing method such as, for example, clustering in an L*a*b color space.

In addition, in step ST4, the Central processing unit 101 applies the divided region correlation algorithm to the left and right images, and performs correlation of the divided regions. Here, divided sub-regions are denoted by left eye images AL, BL, and right eye images AR, BR, CR, . . . .

Figure 3:
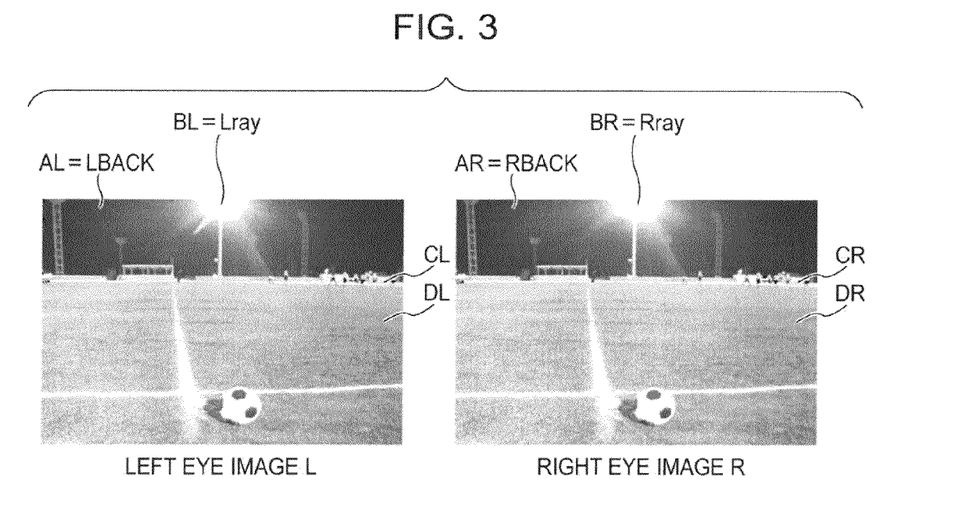
FIG. 3 is a diagram illustrating original images (left eye, image and tight eye image) which include a panoramic view of the soccer field and a labeling result.
Figure 4:
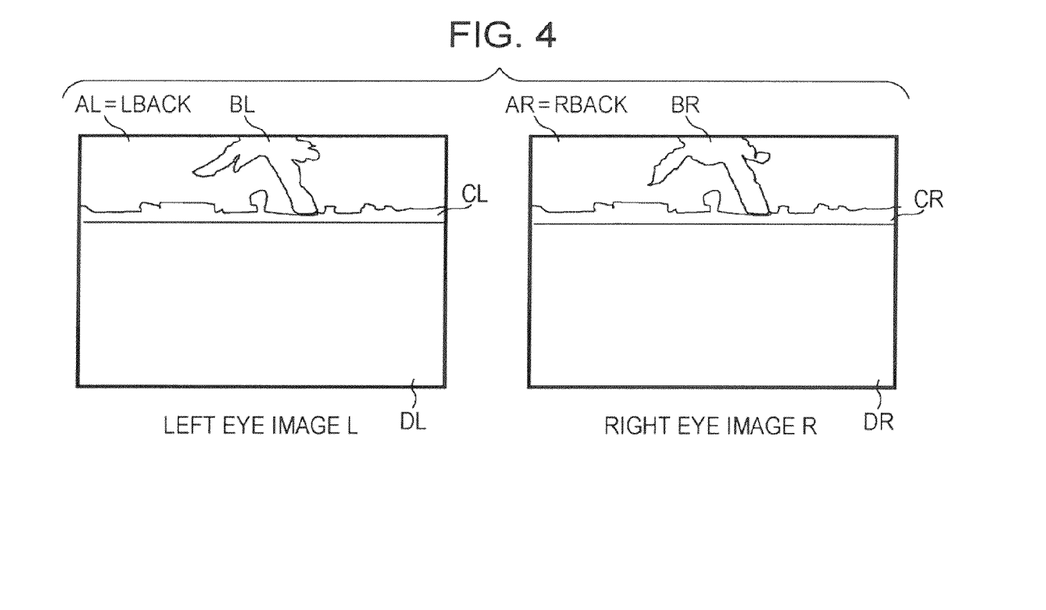
FIG. 4 is a diagram illustrating a region division result and a labeling result for each divided region.
Figure 5:
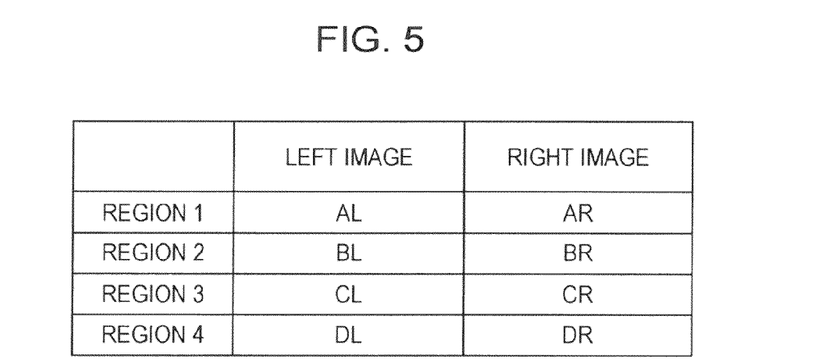
FIG. 5 is a diagram illustrating an example of the divided region correlation of the respective regions of the left eye image and the right eye image.

For example, as shown in FIG. 3, a composition example including nighttime soccer field panoramic view is considered. In the left eye image L and the right eye image R of the composition example, the sky part is denoted by AL and AR, the light source and striation part is denoted by BL and BR, the stand and figure part located at the center right is denoted by CL and CR, and the soccer field region is denoted by DL and DR. FIG. 4 shows region division results and labeling names of the respective divided regions. The central processing unit 101 correlates left and right of each region based on each cluster center coordinate, the number of pixel's in the cluster, and coordinates of pixels forming the cluster in a clustering result in the L*a*b space. FIG. 5 shows left and right correlation result of each region.

Further, in step ST5, the central processing unit 101 applies the striation search algorithm (light source and striation detection algorithm), and detects a striation region and a striation background region using the region division result. An example of the striation search algorithm will be described.

Detection of Light Source

It is assumed that an image region forming a cluster having a region which is predicted to include a light source it the L*a*b space and whose brightness is high (for example, white), as a center, is a light source region. In addition, it is assumed that an image region forming a cluster having a nearly uniform background color (for example, black to deep blue) in the L*a*b space as a center, is a background region such as the sky. In the examples shown in FIGS. 3, 4 and 5, the background and sky substantially correspond to the region 1 (AL and AR), and the light source substantially corresponds to the region 2 (BL and BR).

Figure 6:
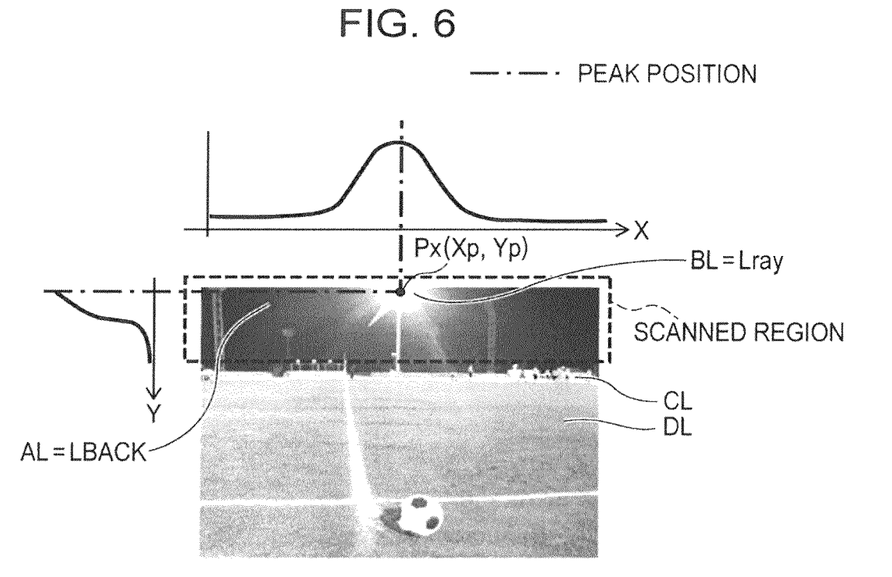
FIG. 6 is a diagram illustrating an algorithm example for detecting a light source position.

In the left eye image L, as shown in FIG. 6, an image region where AL and BL are combined is used as the entire scanning range, and total luminance information of pixels on one line in each of the X direction and Y direction is acquired. A pixel position Px(Xp, Yp) which has peak values in both the X and Y directions is used as a coordinate position of the light source. Although not shown, in the right eye image R, an image region where AR and BR are combined is used as the entire scanning range, and total luminance information of pixels on one line in each of the X direction and Y direction is acquired. A pixel position Px (Xp,Yp) which has peak values in both the X and Y directions is used as a coordinate position of the light source.

Detection of Striation Region and Striation Background Region

Further, an image region where brightness is monotonously decreased according to a distance from the coordinates of the light source and brightness of pixels is equal to or more than a desired threshold value Vth is redetermined as a striation region. The redetermined regions (the striation region and the striation background region) are denoted by AL', BL', AR', and BR'. In addition, here, if the redetermined results and the initial region division results may be considered as the same as each other from conditions such as AL and AL', BL and BL', AR' and AR, and BR' and BR being the same as each other, or the number of overlapping pixels being equal to or more than 99%, the original reference numerals are used.

In addition, in step ST6, the central processing unit 101 applies the image replacement algorithm, and replaces a region formed by the background region AR and the striation region BR of the right eye image with an image formed by the background region AL and the striation region BL of the left eye image. In addition, the central processing unit 101 preserves image data for the right eye image after the replacement in the image data accumulation device 105. In addition, in this case, when the region formed by the background region AR and the striation region BR of the right eye image with an image formed by the background region AL and the striation region BL of the left eye image, the replacement is not merely performed but may be performed after modification so as to be given, parallax.

In a case where the image processing apparatus 100 thereafter delivers two-viewpoint images for stereoscopic display to another system via separate terminals or communication networks, the central processing unit 101 provides the original left eye image and the right eye image after the replacement.

Figure 7:
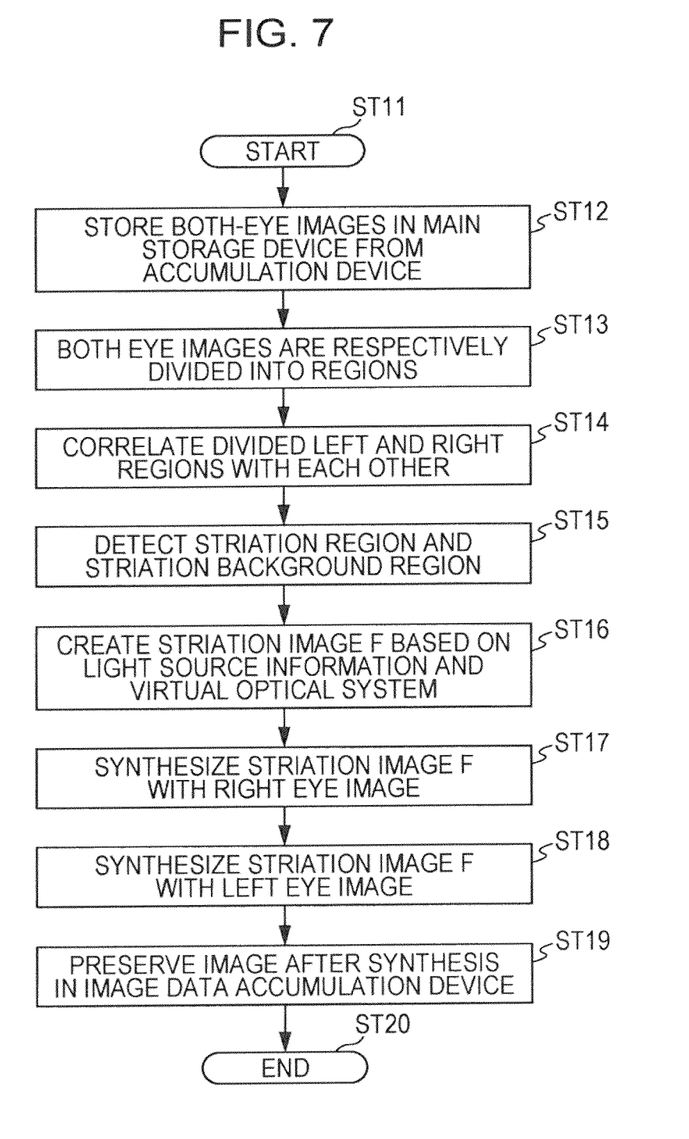
FIG. 7 is a flowchart illustrating an example of the process procedures of the noise removal process in the central processing unit.

The flowchart in FIG. 7 shows an example of process procedures of the noise removal process performed by the central processing unit 101. This example corresponds to process procedures in a case of removing a light source and a light ray included in a striation region from a left eye image and a right eye image, and giving light source and light ray effects having geometric correlation appropriate to view stereoscopic images to both the images.

The central processing unit 101 starts processes, in step ST11, and then the flow proceeds to a process in step ST12. In step ST12, the central processing unit 101 stores left eye image data and right eye image data to be processed in the main storage device 102 from the image data accumulation device 105.

Next, the central processing unit 101 divides each of the left eye image and the right eye image into a plurality of regions in step, ST13. In addition, in step ST14, the central processing unit 101 correlates regions including the same subject with each other or correlates images generated by an optically identical cause with each other, of the divided regions of the left eye image and the right eye image.

Next, the central processing unit 101 detects striation regions including a light source and a striation and a striation background region adjacent to the striation regions from the respective divided regions of the left eye image and the right eye image in step ST15.

Next, in step ST16, the central processing unit 101 creates a striation image F based on light source information and a virtual light source system. In addition, the central processing unit 101 synthesizes the striation image F with the right eye image in step ST17, and synthesizes the striation image F with the left eye image in step ST18. Further, in step ST19, the central processing unit 101 image data for the synthesized left eye image and right eye image in the image data accumulation device 105.

The process in each step of the flowchart in FIG. 7 will be described in more detail. In addition, the processes in steps ST12 to ST15 of the flowchart of FIG. 7 are the same as the processes in steps ST2 to ST5 of the flowchart of FIG. 2, and thus detailed description thereof will be omitted. That is to say, here, the process in step ST16 will be described.

The central processing unit 101 applies the image replacement algorithm in steps ST16 to ST18. That is to say, the central processing unit 101 removes a light source and a striation included in the striation region from the left eye image L and the right eye image R, and gives light source and striation effects having geometric correlation appropriate to view stereoscopic images to both the images.

In other words, the central processing unit 101 corrects the striation region as if the light source and the striation are not present, in both the left eye image L and the right eye image R, using color information and texture information of the striation background region Ax. In addition, the central processing unit 101 sets a virtual light source, having a desired light intensity characteristic, provided at such a light source position that has three-dimensional positional information and is projected onto the light source position Px on the original image detected in step ST15. At this time, radiation directivity of the light source may be added to the characteristics of the virtual light source.

The central processing unit 101 uses the light source position, the light intensity, the radiation directivity, and the like, together, as light source information. In addition, the central processing unit 101, creates a virtual striation image F which is generated by light beams passing through the virtual optical system from the virtual light source having the light source information characteristics, and synthesizes the virtual striation image F with corrected left eye image and right eye image.

Specifically, the striation image F is obtained by rendering a light diffraction phenomenon which is generated by incident light from the above-described virtual light source passing through the virtual optical system which is provided relatively at the same position as a right image optical system capturing an original image. The central processing unit 101 superposes the striation image F on the corrected right eye image at a desired blending ratio. The central processing unit 101 synthesizes the striation image F with the left eye image after performing parallax correction. In addition, the central processing unit 101 preserves image data for the left eye image and right eye image with which the striation image F has been synthesized, in the image data accumulation device 105.

In a case where two-viewpoint images for stereoscopic display are thereafter delivered to another system via separate terminals or communication networks, the central processing unit 101 provides the left eye image and the right eye image with which the striation image F has been synthesized.

In addition, the central processing unit 101 may create and use a filter image (striation image) which is separately created through CG by an existing method such as a buffer reduction method instead of the striation image F through the above-described rendering. In this case, the central processing unit 101, for example, superposes the filter image on the corrected right eye image at a desired blending ratio, performs a process so as to cause striation and light ray effects, and synthesizes the filter image F with the left eye image after performing parallax correction in the same manner.

As described above, in the image processing apparatus 100 shown in FIG. 1, the noise removal process for removing separately generated optical noise is performed on the left eye image and the right eye image which are captured and obtained by the two-lens type stereoscopic image capturing camera. In addition, a geometric mismatch of the left eye image and the right eye image is corrected.

For example, a striation region including a light source and a striation and a striation background region adjacent to the striation region are detected from each of the left eye image and the right eye image, and the striation region and the striation background region of one image is replaced with the striation region and the striation background region of the other image. In addition, for example, a striation region including a light source and a striation and a striation background region adjacent to the striation region are detected from each of the left eye image and the right eye image, and the light source and the striation included in the striation region are removed from the left eye image and the right eye image. In addition, it is possible to give light source and striation effects having geometric correlation appropriate to view stereoscopic images to the left eye image and the right eye image.

For this reason, in the image processing apparatus 100 shown in FIG. 1, it is possible to favorably prevent a viewer perceiving stereoscopic images from feeling discomfort due to optical noise, for example, a striation present in the left eye image and the right eye image.

2. Second Embodiment

Configuration Example of Image Processing Apparatus

Figure 8:
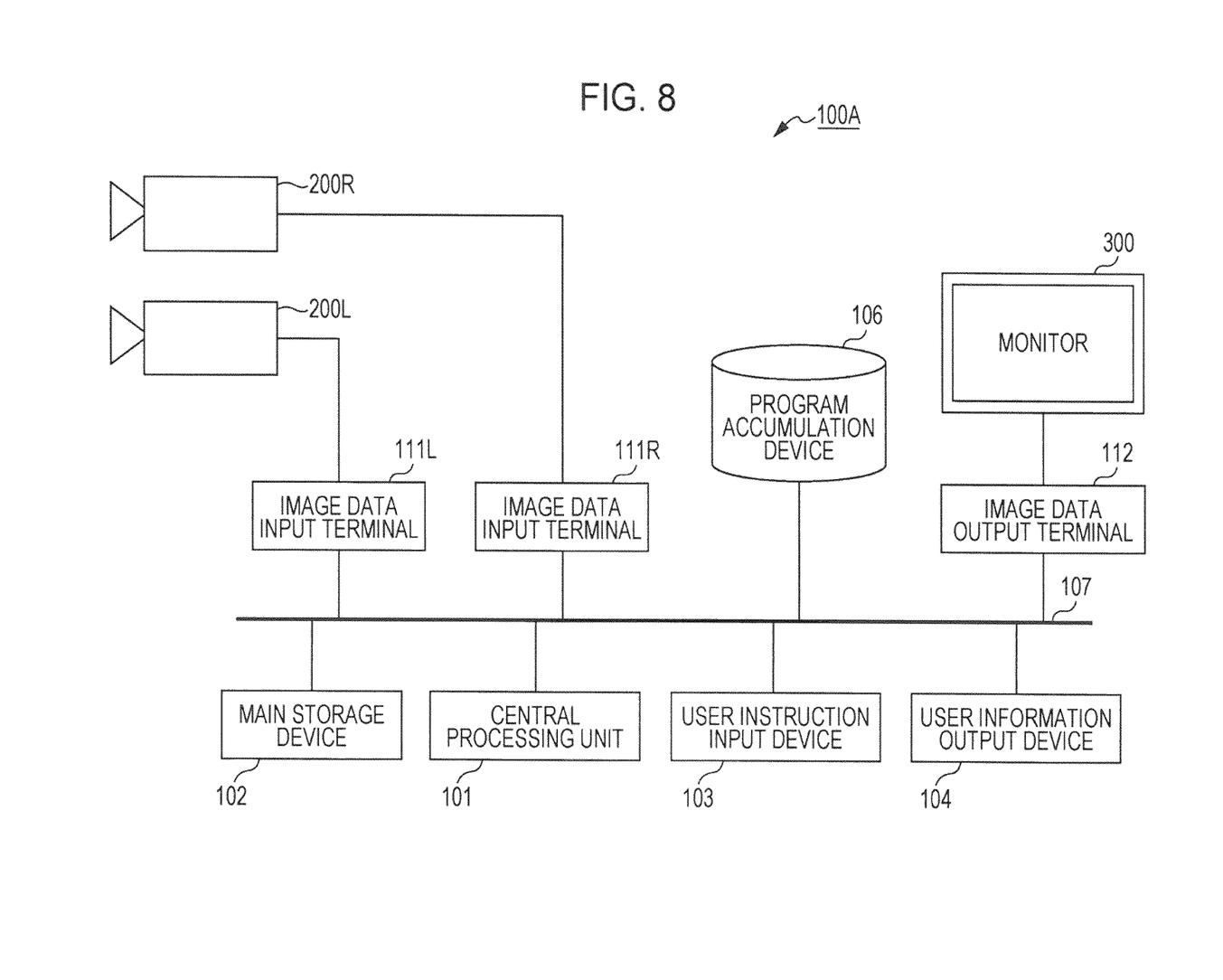
FIG. 8 is a block diagram illustrating a configuration example of the image processing apparatus according to a second embodiment of the present disclosure.

FIG. 8 shows a configuration example of an image processing apparatus 100A according to the second embodiment. In the same manner as the image processing apparatus 100 shown in FIG. 1, the image processing apparatus 100A also performs a process on a left eye image and a right eye image which are captured and obtained by the two-lens type stereoscopic image capturing camera. In FIG. 8, parts corresponding to those in FIG. 1 are given the same reference numerals, and detailed description thereof will be omitted.

The image processing apparatus 100A includes a central processing unit 101, a main storage device 102, a user instruction input device 103, a user information output device 104, a program accumulation device 106, an image data input terminals 111L and 111R, and an image data output terminal 112. The respective parts are connected to an internal bus 107.

The image data input terminal 111L is a terminal for inputting image data for a left eye image captured by a camera system 200L, and photographing setting information such as a diaphragm value in the camera system 200L. The image data input terminal 111R is a terminal for inputting image data for a right eye image captured by a camera system 200S, and photographing setting information such as a diaphragm value in the camera system 200R. The image data output terminal 112 is a terminal for outputting processed left eye image data and right eye image data to an image data output monitor 300.

Although not described in detail, in the same manner as the above-described image processing apparatus 100 shown in FIG. 1, the central processing unit 101 reads the process programs from the program accumulation device 106 and develops the read programs on, for example, the RAM of the main storage device 102, thereby performing noise, removal process. That is to say, the central processing unit 101 performs a process for removing optical noise on image data for left eye images and right eye image input from the camera systems 200L and 200R, and outputs the processed image data to the monitor 300 from the image data output terminal 112.

In addition, the central processing unit 101 performs a process using the photographing setting information which is input from the camera systems 200L and 200R along with the image data. The central processing unit 101 determines whether or not to perform the noise removal process, for example, using the diaphragm value, and thus prevents the noise removal process from being performed wastefully. The determination as to whether or not to perform the noise removal process will be described later again.

The remainders of the image processing apparatus 100A shown in FIG. 8 are the same as those of the image processing apparatus 100 shown in FIG. 1. Therefore, the image processing apparatus 100A shown in FIG. 8 can also achieve the same effects as the image processing apparatus 100 shown in FIG. 1.

In the image processing apparatus 100A shown in FIG. 8, the left eye image data is input from the camera system 200L and the right eye image data is input from the camera system 200R. However, it is not necessary for the left eye image data and the right eye image data to be input from two camera systems. For example, the two camera systems 200L and 200R parts may be one camera system which includes two or more optical systems and thus can output a plurality of images captured from separate viewing fields.

3. Modified Example

In addition, in the above-described embodiments, there has been the description of the example where the noise removal process is performed in order to correct a geometric mismatch of optical noise of the left eye image and the right eye image accumulated in the image data accumulation device 105 or input from the camera systems. The central processing unit 101 may determine whether or not to perform the noise removal process and then may prevent the noise removal process from being performed unnecessarily. With this, for example, it is possible to reduce a calculation amount of the central processing unit (CPU) 101 and to thereby reduce a load thereof. Hereinafter, conditions that the noise removal process is not performed will be described.

(1) In Case of Maximal Radius of Striations is Smaller than Desired Radius

If a radius of a striation is smaller than a desired threshold value, for example, if the number of pixels in the X direction of an image is smaller than $\frac{1}{30}$, the central processing unit 101 does not perform the noise removal process on striations generated with respect to a light source.

(2) in Case where Number of Striations Generated from Light Source is Larger than Desired Number and Thus Interval Between Beams of Striations is Small If the number of striations generated from one light source is larger than a separately set threshold value number, the central processing unit 101 does not perform the noise removal process on any or a portion of striations this case, this is because a visual determination limit is exceeded, that is, the number thereof is large and an interval is small, and thus striations adjacent to; a certain striation may not be discriminated.

Figure 9:
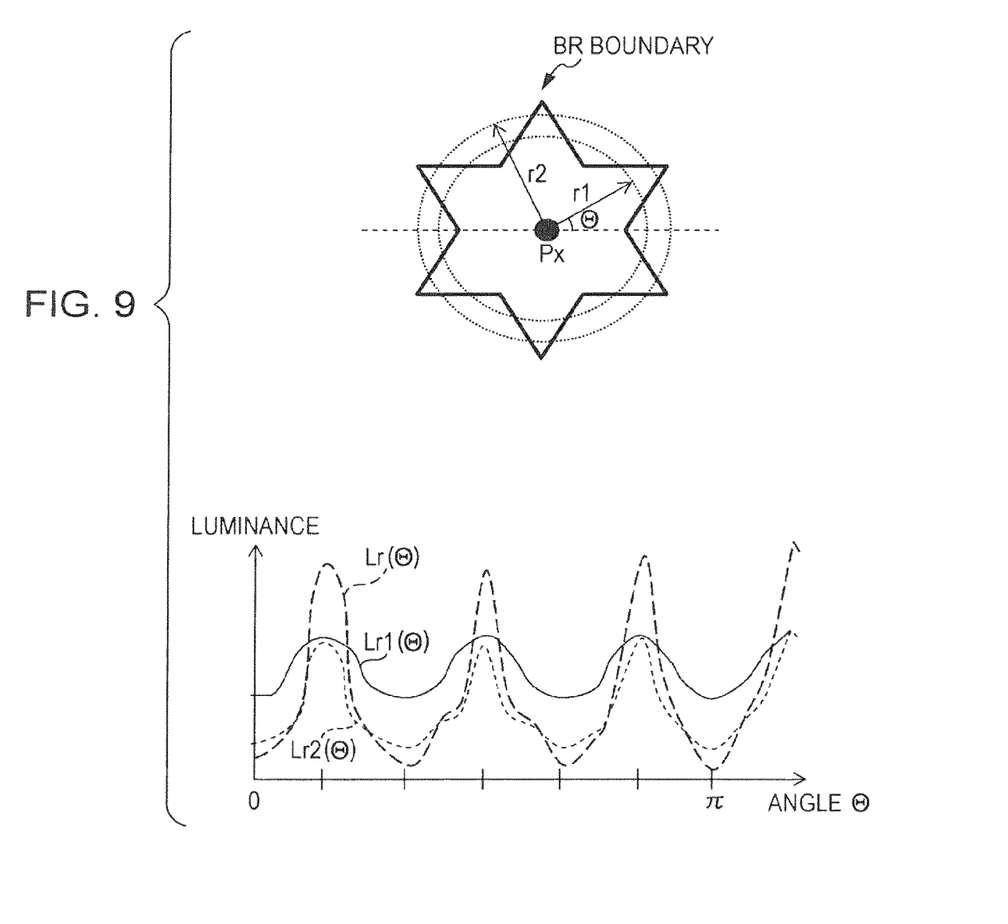
FIG. 9 is a diagram illustrating an example of the method of calculating the number of striations.

Here, there will be made a description of an example of the method of calculating the number of striations with reference to FIG. 9. When the striation region BR and the light source position Px are fixed, the central processing unit 101 plots luminance of points with the distance r which has the light source position (Xp, Yp) as a central point at an angle Θ (range: 0<Θ<2π) while varying r. Further, the central processing unit 101 selects, for example, two arbitrary Lr1 and Lr2 from the plotted curve Lrk, and calculates a correlation thereof "L(Θ)=Lr1(Θ)×Lr2(Θ)". Next, the central processing unit 101 increases the number of striations by 1 each time a maximal value is obtained through calculation of first derivation regarding Θ of L(Θ), and uses a maximal value number (here, six) in 0<Θ<2π as the number of striations.

(3) Even and Odd Numbers and Number of Diaphragm Blades of Camera Lens

The number W of the diaphragm blades of the camera lens has a certain rule with the number of striations, and if W is an even number, W striations are generated, and if W is an odd number, 2W striations are generated. In other words, Comparison of the number of striations generated from the above-described light source with a desired number may be replaced with whether the lens diaphragm has even-numbered blades or odd-numbered blades and with the number of the diaphragm blades. Therefore, the number of the lens diaphragm blades is obtained from the camera setting information, and if the value is, for example, seven or more in odd numbers, the noise removal process is not made to be performed.

(4) In Case where Lasting Time of Striation is Shorter than Desired Threshold Value If time (the number of continuous frames where striations are generated from the same light source in moving images) when striations are generated from an arbitrary light source due to flash of a camera or the like is shorter than a desired threshold value, the noise removal process is not made to, be performed. In this case, this is because the striations do not attract attention in viewing experience for a long time.

(5) In Case where Diaphragm Value of Camera is Smaller than Setting Value

Figure 10A:
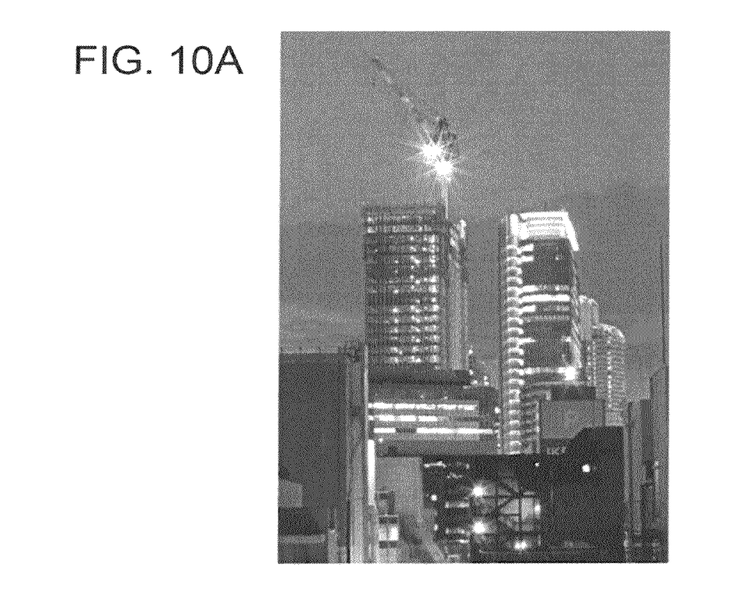
FIGS. 10A and 10B are diagrams illustrating an image example at the diaphragm of F10 and an image example at the diaphragm of F2 through comparison.
Figure 10B:
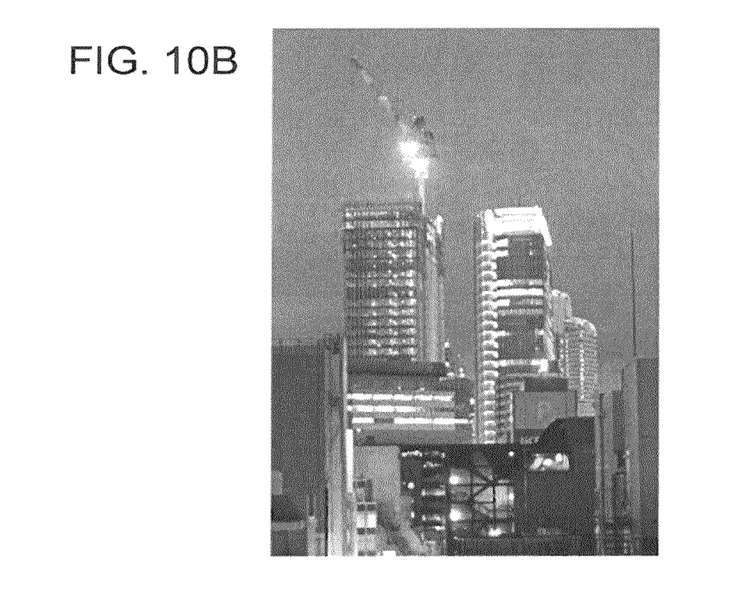

If the diaphragm value of the camera lens becomes larger, generally, the lengths of striation beams are increased. For example, FIG. 10A shows an image example at the diaphragm of F10, and FIG. 10B shows an image example at the diaphragm of F2. Therefore, if the diaphragm value is smaller than the set threshold value (for example, F8), the lengths of striation beams are considered tb be short enough to be allowed, and thus the noise removal process is not made to be performed.

Although the conditions for not performing the process has been described in the above description, conditions for performing the process may be set by reversing the magnitude relationship with the threshold values. In addition, conditions for performing the process, or conditions for not performing the process may be set through combinations of a plurality of conditions.

The present disclosure contains subject matter related to that disclosed in Japanese Priority Patent Application JP 2011-062020 filed in the Japan Patent Office on Mar. 22, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
one or more processors configured to:
    correct a geometric mismatch of optical noise of a left eye image and a right eye image, wherein the geometric mismatch of a first striation and a first light ray occurring in the left eye image and a second striation and a second light ray occurring in the right eye image is corrected, the correction of the geometric mismatch comprising:
        performing a noise removal process remove separately generated optical noise on the left eye image and the right eye image, wherein the left eye image and the right eye image are captured by a two-lens type stereoscopic image capturing camera;
    detect a striation region comprising a light source, a striation and a light ray, and a striation background region adjacent to the detected striation region from each of the left eye image and the right eye image; and
    replace the striation region and the striation background region of one of the left eye image and the right eye image with the striation region and the striation background region of other of the left eye image and the right eye image.

2. The image processing apparatus according to claim 1, wherein the one or more processors are configured to:
    divide each of the left eye image and the right eye image into a plurality of regions; and
    correlate regions comprising the same subject with each other, or regions of images which are generated by an optically identical cause with each other, of the divided regions of the left eye image and the right eye image;
    detect a striation region including a light source, a striation, and a light ray and a striation background region adjacent to the detected striation region from the divided regions of the left eye image and the right eye image; and
    replace the striation region and the striation background region of one of the left eye image and the right eye image with the striation region and the striation background region of the other of the left eye image and the right eye image based on the correlation.

3. The image processing apparatus according to claim 1, wherein the one or more processors are configured to:
    detect a striation region comprising a light source, a striation, and a light ray and a striation background region adjacent to the detected striation region from each of the left eye image and the right eye image; and
    remove the light source, the striation, and the light ray included in the striation region from the left eye image and the right eye image.

4. The image processing apparatus according to claim 3, wherein the one or more processors are configured to:
    divide each of the left eye image and the right eye image into a plurality of regions;
    detect a striation region from the divided regions of the left eye image and the right eye image; and
    remove the light source, the striation, and the light ray included in the striation region from the left eye image and the right eye image.

5. The image processing apparatus according to claim 1, wherein the one or more processors are configured to determine whether the noise removal process is performed.

6. The image processing apparatus according to claim 5, further comprising an input terminal that receives the left eye image, the right eye image, and photographing setting information transmitted from a camera system as input, wherein the one or more processors determine whether the noise removal process is performed based on a diaphragm value included in the photographing setting information.

7. The image processing apparatus according to claim 5, wherein the optical noise is a striation or a light ray, and wherein the one or more processors are configured to determine whether the noise removal process is performed based on the radius of the first and second striations or the first and second light rays occurring in the left eye image and the right eye image.

8. The image processing apparatus according to claim 5, wherein the optical noise is a striation, and wherein the one or more processors are configured to determine whether the noise removal process is performed based on the number of the first and second striations occurring in the left eye image and the right eye image.

9. The image processing apparatus according to claim 5, wherein the optical noise is a striation, and wherein the one or more processors are configured to determine whether the noise removal process is performed based on information of a number of diaphragm blades of a camera lens of a camera used to obtain the left eye image and the right eye image.

10. The image processing apparatus according to claim 5, wherein the optical noise is a striation, and wherein one or more processors are configured to determine whether the noise removal process is performed based on a lasting period of the first and second striations or the first and second light rays occurring in the left eye image and the right eye image.

11. An image processing method comprising:
correcting a geometric mismatch of optical noise of a left eye image and a right eye image, wherein the geometric mismatch of a first striation and a first light ray occurring in the left eye image and a second striation and a second light ray occurring in the right eye image is corrected, the correction of the geometric mismatch comprising:
by performing a noise removal process to remove separately generated optical noise on the left eye image and the right eye image, wherein the left eye image and the right eye image are captured by a two-lens type stereoscopic image capturing camera;
detecting a striation region comprising a light source, a striation and a light ray, and a striation background region adjacent to the detected striation region from each of the left eye image and the right eye image; and
replacing the striation region and the striation background region of one of the left eye image and the right eye image with the striation region and the striation background region of other of the left eye image and the right eye image.

12. A non-transitory computer-readable storage medium having stored thereon, a computer program having at least one code section, the at least one code section being executable by one or more processors for causing a computer to perform steps comprising:
dividing each of the left eye image and the right eye image into a plurality of regions;
correlating regions comprising same subject with each other, or regions of images which are generated by an optically identical cause with each other, of the divided regions of the left eye image and the right eye image;
detecting a striation region comprising a light source, a striation, and a light ray and a striation background region adjacent to the detected striation region from the divided regions of the left eye image and the right eye image; and
replacing the striation region and the striation background region of one of the left eye image and the right eye image with the striation region and the striation background region of other of the left eye image and the right eye image based on the correlation.

13. A non-transitory computer-readable storage medium having stored thereon, a computer program having at least one code section, the at least one code section being executable by one or more processors for causing a computer to perform steps comprising:
dividing each of the left eye image and the right eye image into a plurality of regions;
detecting a striation region comprising a light source, a striation, and a light ray from the divided regions of the left eye image and the right eye image; and
removing the light source, the striation, and the light ray included in the striation region from the left eye image and the right eye image, and generating light source, striation and light ray effects having geometric correlation to view stereoscopic images for the left eye image and the right eye image, wherein generating the light source, striation, and light ray effects comprises:
creating a striation image based on light source information and a virtual optical system; and
synthesizing the striation image with the right eye image and the left eye image.

* * * * *